United States Patent [19]

Kubo et al.

[11] Patent Number: 5,273,196
[45] Date of Patent: Dec. 28, 1993

[54] TAPE TRANSPORT APPARATUS

[75] Inventors: Atsuhiro Kubo; Masato Yamamoto, both of Kanagawa, Japan

[73] Assignee: Sony Magnescale Inc., Tokyo, Japan

[21] Appl. No.: 919,509

[22] Filed: Jul. 24, 1992

Related U.S. Application Data

[63] Continuation of Ser. No. 720,703, Jun. 25, 1991, abandoned.

[30] Foreign Application Priority Data

Jun. 28, 1990 [JP] Japan .................... 2-170692

[51] Int. Cl.⁵ .............................................. B65H 23/24
[52] U.S. Cl. .................... 226/118; 226/196; 226/24; 226/95; 242/183
[58] Field of Search .............. 226/7, 95, 97, 118, 226/196, 24, 27, 28; 242/182, 183

[56] References Cited

U.S. PATENT DOCUMENTS

| | | | |
|---|---|---|---|
| 3,231,668 | 1/1966 | Nishiwaki et al. | 226/95 X |
| 4,181,426 | 1/1980 | Blossey et al. | 226/118 X |
| 4,469,265 | 9/1984 | Manquen | 226/118 X |
| 4,869,410 | 9/1989 | Sota et al. | 226/196 X |

FOREIGN PATENT DOCUMENTS

| | | | |
|---|---|---|---|
| 2309102 | 9/1973 | Fed. Rep. of Germany | 226/118 |
| 0033343 | 4/1981 | Japan | 226/196 |

*Primary Examiner*—Daniel P. Stodola
*Assistant Examiner*—Paul T. Bowen
*Attorney, Agent, or Firm*—Lewis H. Eslinger; Jay H. Maioli

[57] ABSTRACT

An endless tape transport apparatus is comprised of a tape transport unit having a tape feeding device for transporting an endless tape, a tape compartment unit in which the endless tape is housed, the endless tape being transported around the tape transport unit and the tape compartment unit in a loop fashion, and a tape attracting device disposed near the tape feeding device at its position in which the tape attracting device contacts the endless tape, wherein the tape attracting device is driven to attract the endless tape when the endless tape stops running.

3 Claims, 3 Drawing Sheets

TAPE TRANSPORT APPARATUS

This is a continuation of application Ser. No. 07/720,703, filed Jun. 25, 1991, now abandoned.

BACKGROUND OF THE INVENTION

1. Field of the Invention

The present invention generally relates to tape transport apparatus and, more particularly, is directed to an endless tape transport apparatus, such as an announce machine, a commercial signal transmitting apparatus, a master tape transport apparatus of an audio tape and video tape dubbing apparatus and so on for repeatedly transporting a magnetic tape on which a predetermined signal is recorded beforehand.

2. Description of the Prior Art

FIG. 1 shows a previously-proposed endless tape transport apparatus, such as an announce machine, a commercial signal transmitting apparatus and so on for repeatedly transporting an endless magnetic tape on which a predetermined signal is recorded beforehand.

The endless tape transport apparatus shown in FIG. 1 is what might be called a loop bin type. As shown in FIG. 1, this endless tape transport apparatus is comprised of a tape compartment 1 called a loop bin in which a tape or endless tape 2 is housed and a tape transport compartment 3 in which the endless tape 2 supplied from the tape compartment 1 is transported. The tape transport compartment 3 includes therein one tape feeding mechanism 4 formed of a capstan 4a and a pinch roller 4b to take out the endless tape 2 from the tape compartment 1 through a tape exit 1a at a predetermined speed and another tape feeding mechanism 5 formed of a capstan 5a and a pinch roller 5b to transport the endless tape 2 at a predetermined speed so as to feed the endless tape 2 into the tape compartment 1 through a tape entrance 1b. A cue signal detecting head 6, a reproducing head 7 and a recording head 8 are all provided between one tape feeding mechanism 4 and the other tape feeding mechanism 5. The cue signal detecting head 6 is adapted to detect the cue signal inserted into the endless tape 2 so as to detect the starting point, the tape end and so on of the information signal recorded on the endless tape 2. The reproducing head 7 is adapted to reproduce the information signal recorded on the endless tape 2 and the recording head 8 is adapted to record the reproduced number of this endless tape 2 on a predetermined position of the endless tape 2. The reproducing head 7 is adapted to reproduce the information signal recorded on the endless tape 2 and the recording head 8 is adapted to record the reproduced number of the endless tape 2 on a predetermined position of the endless tape 2. In that event, one and the other tape feeding mechanism 4 and 5 constitute a closed loop to thereby perform satisfactory reproduction and recording. In FIG. 1, reference numerals 9a, 9b, 9c and 9d respectively designate tape guides which guide the endless tape 2.

A tape stripping guide 10 is provided between the capstan 5a of the other tape feeding mechanism 5 and the tape entrance 1b of the tape compartment 1 in order to strip the endless tape 2 stuck to the capstan 5a. A tape wrapping preventing guide 11 is provided between the pinch roller 5b of the other tape feeding mechanism 5 and the tape entrance 1b in order to prevent the endless tape 2 from being wrapped around the pinch roller 5b.

An impedance roller 22 enables the tape feeding mechanism 4 to stably transport the endless tape 2 so that the endless tape 2 can be prevented from being transported recklessly. This impedance roller 22 generates a constant back tension for the endless tape 2.

According to the above endless tape transport apparatus shown in FIG. 1, when the tape feeding mechanisms 4 and 5 are driven, the endless tape 2 is transported around the tape transport compartment 3 and the tape compartment 1 in a loop fashion, whereby the information signal recorded on the endless tape 2 can be reproduced repeatedly.

In the conventional endless tape transport apparatus as described above, if the endless tape 2 is released from being held between the capstans 4a, 5a and the pinch rollers 4b, 5b of the tape feeding mechanisms 4, 5 such as when the transport of the endless tape 2 is stopped and the power switch of the apparatus is turned off, then the endless tape 2 falls from and is disengaged from the capstans 4a, 5a and the pinch rollers 4b, 5b. As a consequence, when the transport of the endless tape 2 is started again, the endless tape 2 must be set again. If the endless tape 2 is continuously held between the capstans 4a, 5a and the pinch rollers 4b, 5b for a long period of time after the transport of the endless tape 2 is stopped, there is then the risk that the pinch rollers 4b, 5b will be deformed because the pinch rollers 4b, 5b are made of resilient material. Furthermore, if the endless tape 2 is continuously held between the capstans 4a, 5a and the pinch rollers 4b, 5b for a long period of time, then the endless tape 2 also will be deformed and damaged.

OBJECTS AND SUMMARY OF THE INVENTION

Accordingly, it is an object of the present invention to provide an improved endless tape transport apparatus in which the aforementioned shortcomings and disadvantages of the prior art can be substantially eliminated.

More specifically, it is an object of the present invention to provide an endless tape transport apparatus in which an endless tape can be prevented from falling from and being disengaged from a predetermined position when a power switch of the apparatus is turned off.

It is another object of the present invention to provide an endless tape transport apparatus in which resilient pinch rollers or the like can be prevented from being deformed even when an endless tape is set in the stop mode for a long period of time.

It is a further object of the present invention to provide an endless tape transport apparatus in which an endless tape can be prevented from being deformed and damaged even when the endless tape is set in the stop mode for a long period of time.

As an aspect of the present invention, an endless tape transport apparatus is comprised of a tape transport unit having a tape feeding device for transporting an endless tape, a tape compartment unit in which the endless tape is housed, the endless tape being transported around the tape transport unit and the tape compartment unit in a loop fashion, and a tape attracting device disposed near the tape feeding device at a position in which the tape attracting device contacts the endless tape, wherein the tape attracting device is driven to attract the endless tape when the endless tape stops running.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
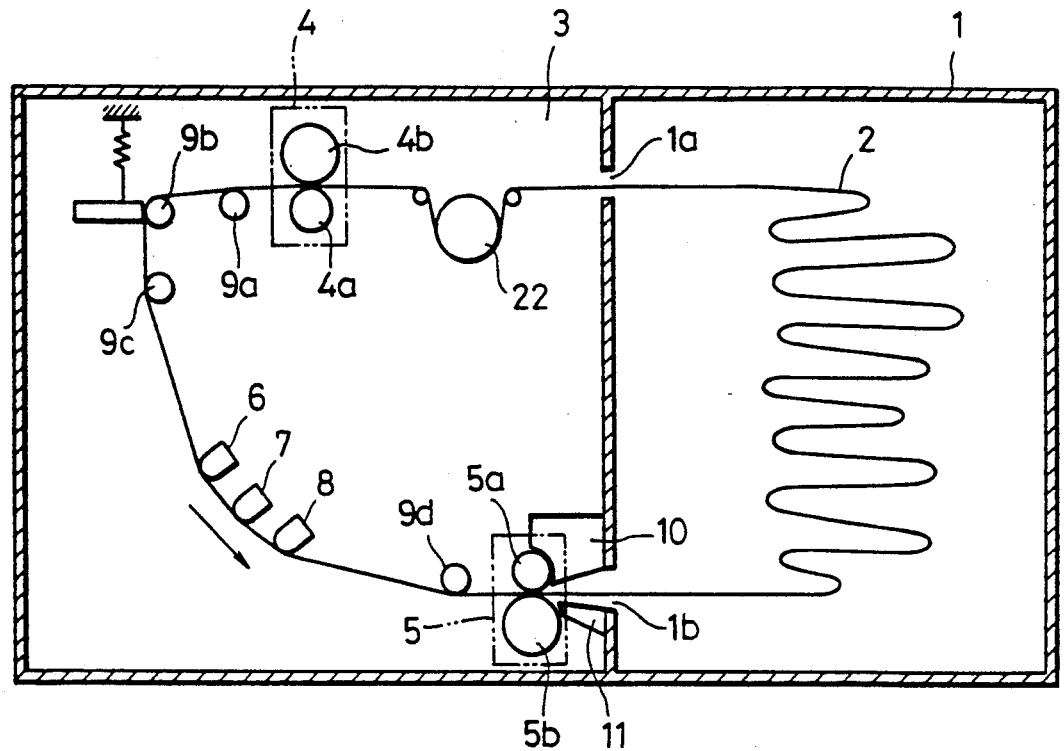
FIG. 1 is a plan view illustrating an example of a conventional endless tape transport apparatus.
Figure 2:
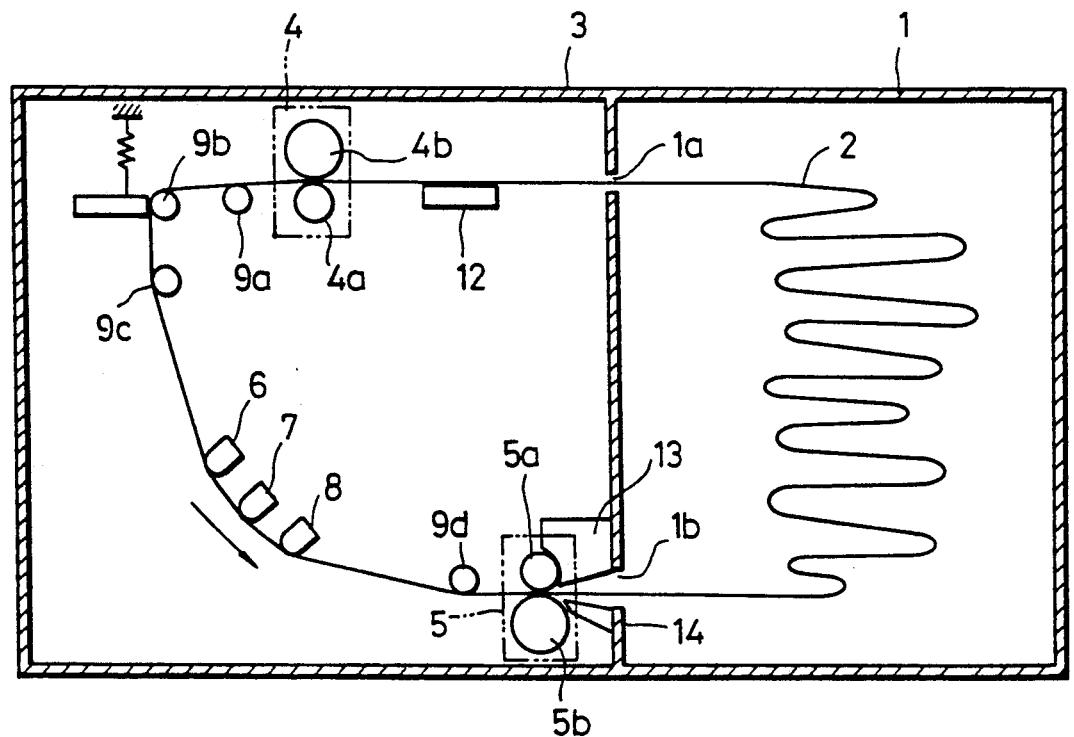
FIG. 2 is a plan view illustrating an embodiment of an endless tape transport apparatus according to the present invention.

An embodiment of the endless tape transport apparatus according to the present invention will now be described with reference to FIGS. 2 through 6. In FIG. 2, like parts corresponding to those of FIG. 1 are marked with the same references and therefore need not be described in detail.

In this embodiment, as shown in FIG. 2, the endless tape transport apparatus includes the tape compartment 1 in which the endless tape 2 is housed and the tape transport compartment 3 in which the endless tape 2 supplied from the tape compartment 1 is transported. The tape transport compartment 3 includes therein one tape feeding mechanism 4 formed of the capstan 4a and the pinch roller 4b to take out the endless tape 2 from the tape compartment 1 through the tape exit 1a at a predetermined speed and another tape feeding mechanism 5 formed of the capstan 5a and the pinch roller 5b to transport the endless tape 2 at a predetermined speed so as to feed the endless tape 2 into the tape compartment 1 through the tape entrance 1b. As earlier noted, the cue signal detecting head 6, the reproducing head 7 and the recording head 8 are all provided between one tape feeding mechanism 4 and the other tape feeding mechanism 5. The cue signal detecting head 6 is adapted to detect the cue signal inserted into the endless tape 2 so as to detect the starting point, the tape end and so on of the information signal recorded on the endless tape 2. The reproducing head 7 is adapted to reproduce the information signal recorded on the endless tape 2 and the recording head 8 is adapted to record the reproduced number of this endless tape 2 on a predetermined position of the endless tape 2. In that event, the tape feeding mechanisms 4 and 5 constitute a closed loop to thereby perform satisfactory reproduction and recording.

Figure 3:
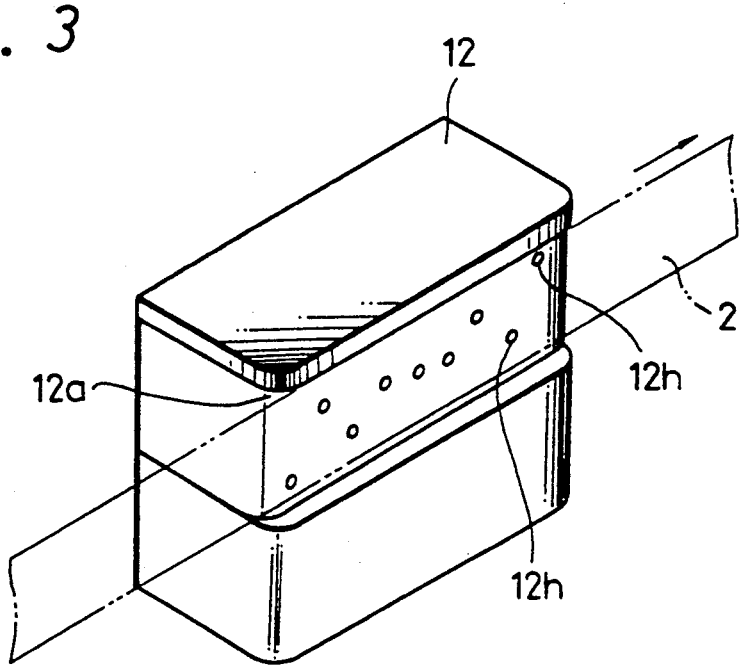
FIGS. 3, 4 and 5 are respectively perspective views illustrating examples of main portions of the present invention.

Particularly, in this embodiment, a tape attracting member 12 serving as a tape guide is disposed within the tape transport compartment 3 at the tape contact position near the tape exit 1a side of the tape feeding mechanism 4. As shown in FIG. 3, a tape contact surface 12a of the tape attracting member 12 has a predetermined area. By way of example, the tape contact surface 12a has a width equal to the tape width of the endless tape 2 and a length of several centimeters in the tape transport direction. Further, a number of air sucking apertures, e.g., nine air sucking apertures 12h for sucking air are bored through the tape contact surface 12a of the tape attracting member 12. The nine air sucking apertures 12h are randomly bored through the tape contact surface 12a of the tape attracting member 12 so that these nine air sucking apertures 12h may not overlap each other in the tape transport direction.

In this case, since the tape contact surface 12a of the tape attracting member 12 has the predetermined area and the nine air sucking apertures 12h are randomly bored through the tape contact surface 12a so as not to overlap each other in the tape transport direction, the tape attracting member 12 serves as a back tension applying means even when the endless tape 2 is transported, thus the endless tape 2 is prevented from being deformed and damaged during its transport.

Figure 4:
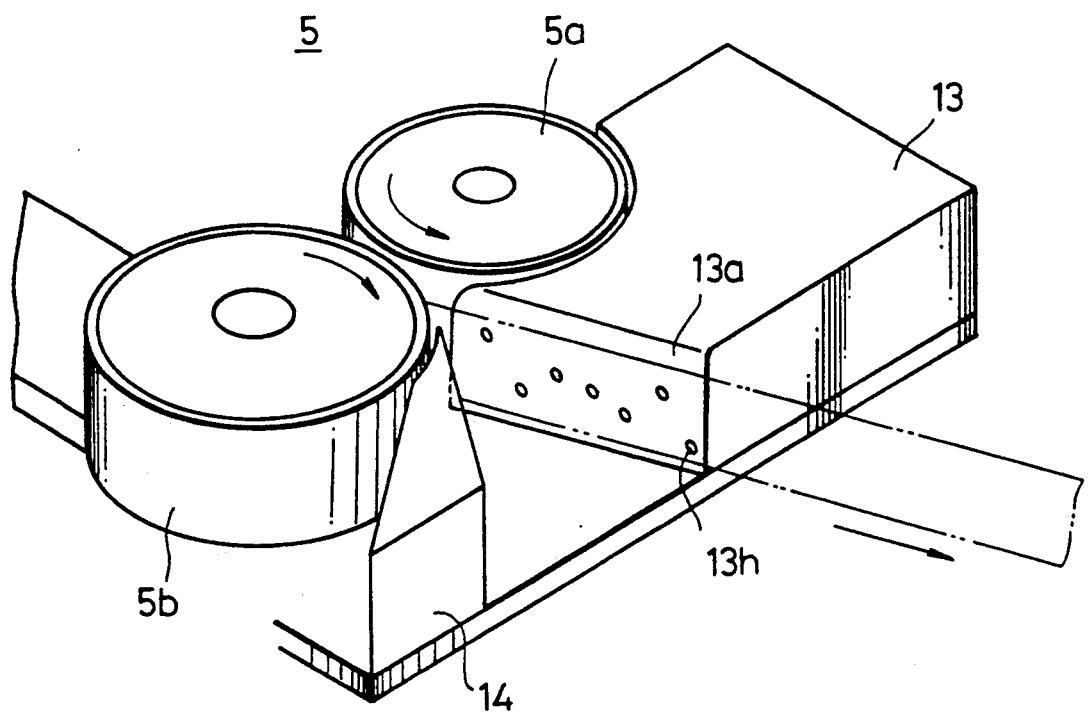

Further, in this embodiment, a tape stripping guide 13 is disposed between the capstan 5a of the tape feeding mechanism 5 and the tape entrance 1b of the tape compartment 1 so as to strip the endless tape 2 stuck to the capstan 5a. As shown in FIG. 4, this tape stripping guide 13 is disposed so as to coincide with a part of the outer periphery of the capstan 5a. A tape contact surface 13a of the tape stripping guide 13 has a predetermined area and a number of air sucking apertures, i.e., seven air sucking apertures 13h are bored through the tape contact surface 13a. In that case, the seven air sucking apertures 13h are randomly bored through the tape contact surface 13a so as not to overlap each other in the tape transport direction.

Since the tape stripping guide 13 of the present invention is constructed as described above, similar to the above tape attracting member 12, the endless tape 2 can be prevented from being deformed and damaged when it is attracted by the tape stripping guide 13.

Figure 6:
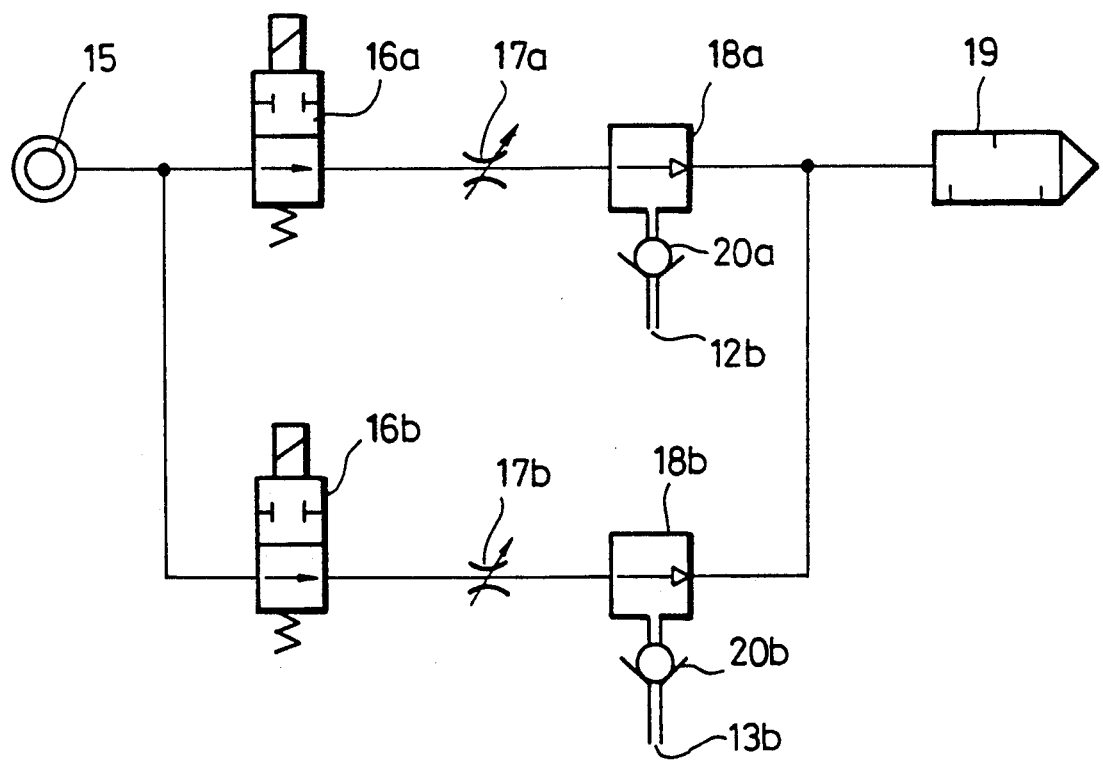
FIG. 6 is a schematic diagram showing an example of a circuit which develops a stream of air used in the present invention.

A circuit for developing the stream of air for supplying the air into the tape attracting member 12 and the tape stripping guide 13 is represented in FIG. 6.

Referring to FIG. 6, there is shown an air supplying source 15 which sends air. The air from the air supplying source 15 is ejected through an electromagnetic solenoid valve 16a, a flow amount adjusting valve 17a, an ejector 18a and a silencer 19. Also, air from a tube 12b coupled to the tape attracting member 12 is supplied through a check valve 20a to the ejector 18a and air from the air supplying source 15 is ejected through an electromagnetic solenoid valve 16b, a flow amount adjusting valve 17b, an ejector 18b and the silencer 19. Further, air from a tube 13b coupled to the tape stripping guide 13 is supplied through a check valve 20b to the ejector 18b.

The attracting forces of the tape attracting member 12 and the tape stripping guide 13 can be adjusted arbitrarily by the flow amount adjusting valves 17a and 17b and, the attractions of the endless tape 2 by the tape attracting member 12 and the tape stripping guide 13 can be released by turning the electromagnetic solenoid valves 16a, 16b off.

Figure 5:
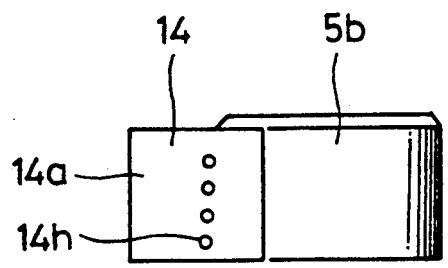

Further, turning back to FIG. 2, a tape wrapping preventing guide 14 is disposed between the pinch roller 5b of the tape feeding mechanism 5 and the tape entrance 1b in order to prevent the endless tape 2 from being unintentionally wrapped around the pinch roller 5b. As shown in FIG. 5, a number of air flowing apertures 14h are bored through the tape wrapping preventing guide 14 at its tape contact surface 14a opposing to the tape contact surface 13a of the tape stripping guide 13. In the embodiment of FIG. 2, the rest of elements is the same as that of the example of the prior art shown in FIG. 1 and need not be described.

Since the endless tape transport apparatus of the present invention is constructed as described above, the tape feeding mechanisms 4 and 5 are driven and the attracted states of the endless tape 2 by the tape attracting member 12 and the tape stripping guide 13 are released, whereby the endless tape 2 is transported through the tape transport compartment 3 and the tape compartment 1 in a loop fashion. Thus, the information signal recorded on the endless tape 2 can be reproduced repeatedly. In that case, the endless tape 2 may be applied with a predetermined tension by the predetermined attracting force caused by the tape attracting member 12.

When the transport of the endless tape 2 is stopped, then the electromagnetic solenoid values 16a, 16b are turned on and the air is supplied to the ejectors 18a, 18b. As a consequence, the air is sucked from the air sucking apertures 12h and 13h of the tape attracting member 12 and the tape stripping guide 13, whereby the endless tape 2 is attracted by the tape attracting member 12 and the tape stripping guide 13. In that case, since the air is flown from the air flowing apertures 14h of the tape wrapping preventing guide 14 although the transport of the endless tape 2 is not stopped under the condition such that the tape contact surface 13a of the tape stripping guide 13 and the attracting surface of the endless tape 2 are constantly in contact with each other, the endless tape 2 can be attracted to the tape contact surface 13a of the tape stripping guide 13 satisfactorily. After the endless tape 2 is attracted to the tape attracting member 12 and the tape stripping guide 13, the endless tape 2 is released from being held between the capstans 4a, 5a and the pinch rollers 4b, 5b of the tape feeding mechanisms 4, 5 and the flowing of air from the tape wrapping preventing guide 14 is stopped.

At that time, since the endless tape 2 is attracted by the tape attracting member 12 and the tape stripping guide 13, the endless tape 2 can be prevented from falling from and being disengaged from the predetermined portions. Also, even when the the endless tape 2 is continuously set in the stop mode for a long period of time, the capstans 4a, 5a and the pinch rollers 4b, 5b are released from contact with the endless tape 2 so that the pinch rollers 4b, 5b made of resilient member can be prevented from being deformed. Also, the endless tape 2 can be prevented from being deformed and damaged.

When the transport of the endless tape 2 is started once again from the stop mode, the endless tape 2 is held between the capstans 4a, 5a and the pinch rollers 4b, 5b and then the endless tape 2 is released from being attracted by the tape attracting member 12 and the tape stripping guide 13. Thereafter, the capstans 4a, 5a are rotated at a predetermined speed by a motor (not shown).

According to the present invention, even when the tape feeding mechanisms 4, 5 are released under the condition that the transport of the endless tape 2 is stopped, the endless tape 2 can be prevented from falling from and being disengaged from the predetermined portion. Also, even when the endless tape 2 is continuously set in the stop mode for a long period of time, the pinch rollers 4b, 5b, for example, can be prevented from being deformed and the endless tape 2 also can be prevented from being deformed and damaged.

Furthermore, since the tape contact surfaces 12a, 13a of the tape attracting means 12, 13 have the predetermined areas and a number of attracting apertures 12h and 13h are bored through the tape contact surfaces 12a, 13a so as not to overlap each other in the tape transport direction, the attracting force is not one-sided even during the tape transport and therefore the tape attracting means 12, 13 can be prevented from deforming and damaging the endless tape 2.

Having described the preferred embodiment of the invention with reference to the accompanying drawings, it is to be understood that the invention is not limited to that precise embodiment thereof and that various changes and modifications thereof could be effected by one skilled in the art without departing from the spirit or scope of the novel concept of the invention as defined in the appended claims.

We claim as our invention:

1. An endless tape transport apparatus comprising:
a tape transport section having tape feeding means for transporting an endless tape;
a tape compartment section in which said endless tape is housed, said endless tape being transported within said tape transport section and said tape compartment section in a loop fashion;
means for selectively providing an air flow; and
tape attracting and holding means disposed near said tape feeding means in contact with said endless tape and connected to said means for selectively providing an air flow, said air flow being selectively provided for rendering said tape attracting and holding means inoperative when said tape is being transported by said tape transport section and for rendering said tape attracting and holding means operative for attracting and holding said endless tape by a negative air flow when said endless tape is stopped being transported by said tape transport section, wherein said tape attracting means has a tape contact surface of a predetermined area and said tape contact surface has a number of attracting apertures bored therethrough and connected to the negative air flow from said means for selectively providing an air flow, so that the negative air flow attracts and holds said tape against said tape contact surface when said tape is stopped being transported, and wherein said attracting apertures are bored through said tape contact surface in a random pattern so as not to overlap each other in a tape transport direction.

2. An endless tape transport apparatus according to claim 1, wherein said tape attracting means includes lip means for guiding longitudinal edges of the endless tape as it is being transported.

3. An endless tape transport apparatus according to claim 1, further comprising tape stripping means and tape wrapping preventing means disposed in an opposing relation to said tape stripping means, wherein said tape stripping means is connected to said means for selectively providing an air flow so that a negative air flow is applied to said tape stripping means so that said endless tape is attracted thereto.

* * * * *